(12) United States Patent
Mullen

(10) Patent No.: US 7,940,169 B2
(45) Date of Patent: May 10, 2011

(54) SYSTEM AND METHOD FOR INSTALLED BASE DATA MAINTENANCE

(75) Inventor: Paul Lawrence Mullen, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 1274 days.

(21) Appl. No.: 11/453,950

(22) Filed: Jun. 15, 2006

(65) Prior Publication Data

US 2007/0293151 A1    Dec. 20, 2007

(51) Int. Cl.
G08B 13/14 (2006.01)
G08B 1/08 (2006.01)

(52) U.S. Cl. ......... 340/539.13; 340/539.11; 340/539.12; 340/539.14; 340/572.1

(58) Field of Classification Search .......................... None
See application file for complete search history.

(56) References Cited

U.S. PATENT DOCUMENTS

| | | | |
|---|---|---|---|
| 4,688,026 A * | 8/1987 | Scribner et al. ............... | 235/385 |
| 6,120,447 A | 9/2000 | Mullen | |
| 6,224,551 B1 | 5/2001 | Mullen | |
| 6,238,341 B1 | 5/2001 | Mullen | |
| 6,290,649 B1 | 9/2001 | Miller | |
| 6,366,206 B1 | 4/2002 | Ishikawa | |
| 6,525,648 B1 | 2/2003 | Kubler | |
| 6,600,418 B2 | 7/2003 | Francis | |
| 6,693,539 B2 | 2/2004 | Bowers | |
| 6,700,493 B1 * | 3/2004 | Robinson ................... | 340/573.1 |
| 6,714,121 B1 * | 3/2004 | Moore ......................... | 340/10.3 |
| 6,747,561 B1 | 6/2004 | Reeves | |
| 6,829,520 B1 * | 12/2004 | Green .......................... | 700/225 |
| 6,842,121 B1 * | 1/2005 | Tuttle ......................... | 340/693.9 |
| 6,882,315 B2 | 4/2005 | Richley | |
| 6,967,577 B2 | 11/2005 | Taylor | |
| 7,323,991 B1 * | 1/2008 | Eckert et al. ............... | 340/572.1 |
| 7,482,931 B2 * | 1/2009 | Lin ............................. | 340/572.1 |
| 2005/0083171 A1 * | 4/2005 | Hamilton ..................... | 340/5.7 |
| 2005/0246092 A1 * | 11/2005 | Moscatiello .................. | 701/207 |
| 2006/0028343 A1 * | 2/2006 | Taylor et al. ............... | 340/572.1 |
| 2007/0013516 A1 * | 1/2007 | Freitag et al. ............... | 340/572.1 |
| 2007/0090951 A1 * | 4/2007 | Chan et al. .................. | 340/572.1 |
| 2007/0198282 A1 * | 8/2007 | Williams et al. ................... | 705/1 |
| 2007/0205896 A1 * | 9/2007 | Beber et al. ................ | 340/572.1 |
| 2007/0268136 A1 * | 11/2007 | Adamec et al. ............ | 340/572.1 |
| 2008/0079581 A1 * | 4/2008 | Price .......................... | 340/572.1 |
| 2008/0094206 A1 * | 4/2008 | Martinez de Velasco Cortina et al. ......................... | 340/539.11 |
| 2008/0278328 A1 * | 11/2008 | Chand et al. ............... | 340/572.1 |

* cited by examiner

*Primary Examiner* — Julie Lieu
(74) *Attorney, Agent, or Firm* — Fletcher Yoder

(57) ABSTRACT

In accordance with one aspect of the present invention, there is provided a method for tracking devices. The method for tracking devices comprises carrying a reading device to passively receive identification data from a transmitter without action on the part of the user. Additionally, the method comprises providing the identification data to a database.

26 Claims, 3 Drawing Sheets

SYSTEM AND METHOD FOR INSTALLED BASE DATA MAINTENANCE

BACKGROUND

For entities that sell and/or service various types of equipment (such as medical systems, aircraft engines, computer equipment, and so forth), the maintenance of an accurate list of installed systems may be important for both regulatory and business reasons. For example, in the event of a recall, it would be important to know how many systems need to be recalled where they are located, and who to contact. Additionally, it may be important to know whether certain equipment is still being utilized by customers when making decisions about whether or not equipment should be phased out of production and support.

The typical approach of maintaining data on installed systems involves keeping records of equipment shipments or installations. Though this approach is straight forward and effective for a short time following installation or shipment, it does not track assets well over a long period of time. For example, when equipment's effective life is long, the equipment may be moved or sold before it is decommissioned, making it difficult to maintain accurate records.

In current inventory tracking systems, movement of the equipment may not be captured because reporting of such movement does not always occur. For example, in the event the equipment is sold, or there is a change of ownership, subsequent movement of the equipment may not be recorded in the records of the manufacturer or the records of a service provider.

Further, systems configured to track the movement of equipment may be inadequate. For example, current radio frequency identification (RFID) asset location systems typically require an installed infrastructure of antennas, satellites, or similar fixed assets that may not provide sufficient geographic coverage to determine the location of devices which may be physically moved to other buildings or facilities, i.e., off-site. For example, even if a system is capable of tracking a portable X-ray system located inside a hospital, once it leaves the hospital its location may be indeterminate using current location systems. Similarly, if the same portable X-ray system enters a different hospital, it may or may not be identified due to differences in the infrastructure. Additionally, in many instances there is not a common inventory database between different hospitals to identify the device. Even if there is such a common database, however, it may not be shared with the manufacturer or service provider interested in maintaining accurate installed base information.

SUMMARY

Certain aspects commensurate in scope with the originally claimed invention are set forth below. It should be understood that these aspects are presented merely to provide the reader with a brief summary of certain forms of the invention might take and that these aspects are not intended to limit the scope of the invention. Indeed, the invention may encompass a variety of aspects that may not be set forth below.

In accordance with one aspect of the present invention, a method for tracking devices is provided. The method comprises carrying a reading device to passively receive identification data from a transmitter without action on the part of the user. The method further comprises providing the identification data to a database.

In accordance with another aspect of the present invention, a method of tracking installed systems is provided. The method comprises carrying a wireless reader to locations where devices of interest are installed. Without action on the part of the person carrying the reader, identification data is collected for the devices of interest using the wireless reader. The identification data is provided to a database.

In accordance with another aspect of the present invention, a system for tracking installed equipment is provided. The system comprises an information device associated with a piece of equipment. The information device is configured to transmit identification data corresponding to the equipment to a wireless receiver. The identification data is received by the wireless receiver without user action.

Further, in yet another aspect of the present invention, a tracking system is provided. The tracking system comprises an information device associated with a piece of equipment. The information device is configured to transmit identification data corresponding to the equipment. A wireless receiver is configured to receive the identification data without user action. A computing device is configured to download identification data from the wireless receiver. The computing device transmits the identification data via a transmission network to a database. The database is configured to receive identification data.

In accordance with another aspect of the present invention, a method for maintaining a database of devices of interest is provided. The method comprises tagging each device of interest with a wireless identification device. Each wireless identification device contains identification information for the device of interest to which it is tagged. A reading device is transported within communication range of at least one of the devices of interest. The reading device is configured to receive the identification information for each device of interest when within communication range of that device of interest. A database of the devices of interest is updated using the identification information received by the reading device.

In yet another aspect of the present invention, a method for maintaining an installation database of devices of interest is provided. The method comprising tagging each device of interest with a wireless identification device. Each wireless identification device contains identification information for the device of interest to which its tagged. A reading device is provided to each of a plurality of field workers who travel to locations where the devices of interest are installed. Each reading device is configured to receive the identification information for the devices of interest when the field worker travels within communication range of the wireless identification devices. An installation database of the devices of interest is updated using the identification information received by the reading devices.

BRIEF DESCRIPTION OF THE DRAWINGS

Certain exemplary embodiments are described in the following detailed description and in reference to the drawings in which.

DETAILED DESCRIPTION

Equipment manufacturing companies, as well as companies that service equipment, commonly desire to maintain an accurate list of installed systems when the equipment has a long effective life cycle and/or high resale value. The manufacturers and service companies typically employ field personnel, such as service technicians or engineers, who visit installation sites to install, service, or maintain the equipment. The employees may visit the installation sites or installed systems periodically (such as in accordance with a maintenance schedule) or according to need as indicated by the user or owner of the installed system. As will be discussed below, these employees may be used to passively gather information in order to maintain an accurate database of installed systems. Specifically, the employees may be equipped with wireless readers capable of collecting identification and/or location data from devices attached to or installed on the equipment.

Figure 1:
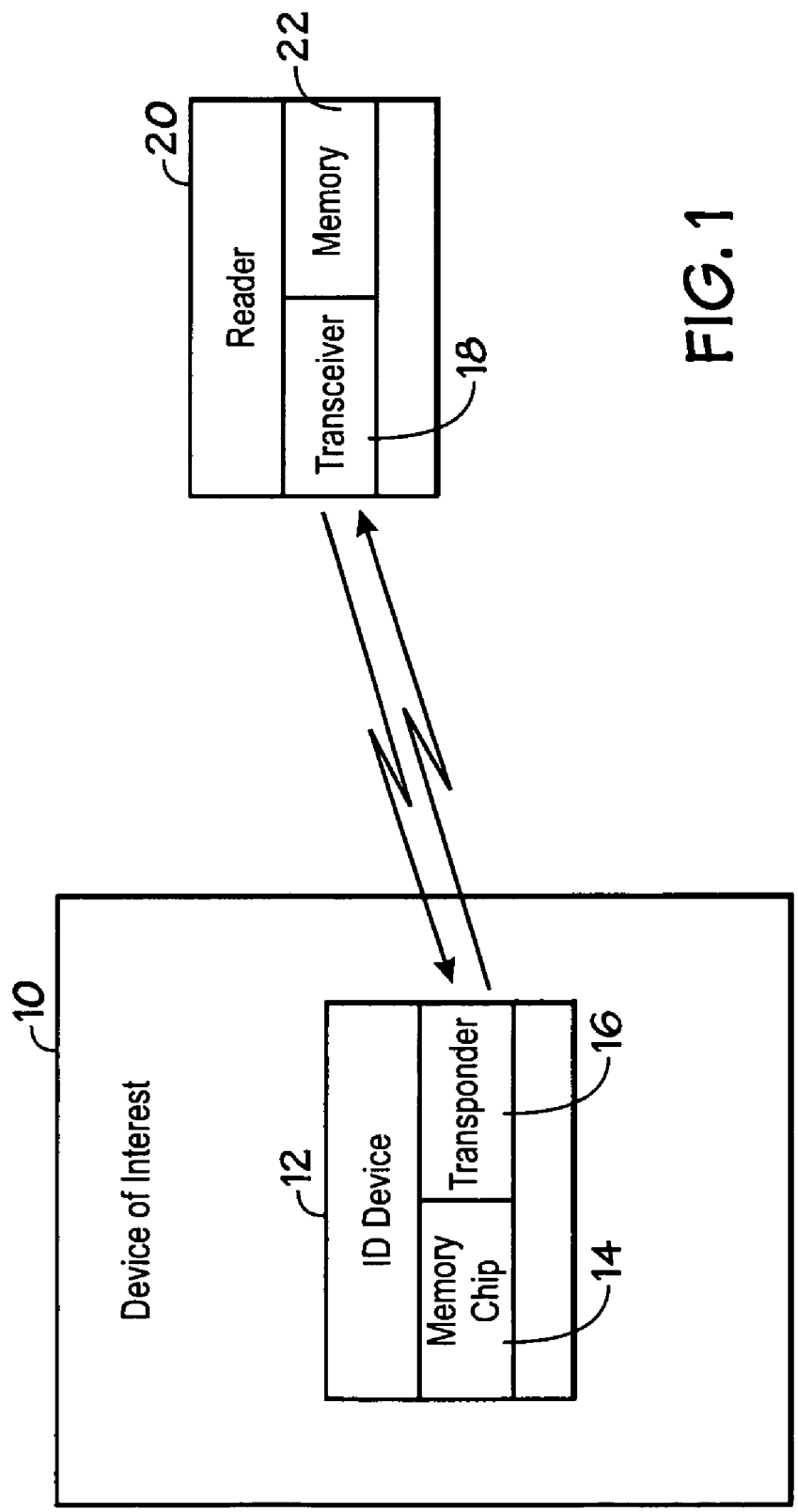
FIG. 1 illustrates equipment having an identification device in accordance with an exemplary embodiment of the present invention.

A block diagram illustrating equipment having an identification device is shown in FIG. 1 in accordance with an exemplary embodiment of the present invention. A device of interest 10, such as an X-ray machine or other piece of valuable equipment, is tagged with an identification device 12. The device of interest 10 may be tagged with the identification device 12 at the time a company initiates its interest in the instrument. For example, when a service company is first hired to service the equipment, they can place an identification device 12 on a device of interest 10. Alternatively, the identification device 12 may be installed or placed on the device of interest 10 at the time of manufacture, such as by an OEM, at the time of shipment, or at the time of installation, such as by a field engineer.

The identification device 12 can be a passive, semi-passive, or active device. The passive and semi-passive devices are configured to respond to queries from a transceiver by backscattering an incoming signal. The active device, however, may autonomously transmit an intermittent or continuous signal. Each type of device has advantages and trade-offs that may make one type more ideal for a particular application.

The passive device operates without a battery, for example, allowing the device to be cheaper, smaller in size, and operate indefinitely without needing maintenance. The transmission range of the passive device, however, may be significantly less than the other types of devices. Additionally, memory size may be more limited in a passive device, than the other types of device. The semi-passive and active devices operate with a battery or other powered means, such as the power supply of the device. These types of devices can provide a stronger signal and consequently a greater range for detection by a receiver or a reader.

While providing a greater transmission range, if a battery is employed in the semi-passive or active devices, battery replacement may periodically be necessary throughout the life of the equipment. Further, active devices powered by the power supply of the device being tracked are more complex to install and maintain and may be subject to the power status of the device, i.e., if the device is unpowered, the active device may also be powerless.

Selection of a particular type of identification device will therefore depend on a variety of factors that may be determined prior to the installing an identification device. In a given system there may be a need for passive, semi-passive and active devices to be implemented together due to issues associated with particular equipment, operating environments, or customer concerns.

The identification device 12 is configured to transmit identification data related to the device of interest. The identification data transmitted can be fairly comprehensive, indicating manufacturer, make and model, date of manufacture, and data of purchase, among other things, or, alternatively, the identification data may include only file number or serial number and additional information can be stored at a database. For example, in one embodiment the identification device 12 may transmit only the serial number of a device, in which case the serial number would be associated with other identifying data, such as make and model information, etc., in the database. In another embodiment, the identification device 12 may transmit all pertinent identification information associated with the device of interest 10 and the identification information is simply recorded in the database and associated with previous records of the device of interest 10.

As shown in FIG. 1, the identification device 12 may include a memory 14, such as a memory chip or a magnetic or optical memory medium, for holding identification data, such as make and model of the device 10 or other information. Additionally, the depicted exemplary identification device 12 has a transmitter 16. The transmitter 16 transmits some or all of the information stored on the memory chip 14 to a transceiver 18, which is part of a reader device 20.

The reader device 20 is configured to store the information obtained from the identification device 12 in memory 22 of the reader 20. The transceiver may be configured to continually transmit a signal to which the identification device 12 is responsive or, alternatively, may be continuously receptive to signals continually transmitted by the identification device 12. For example, in one embodiment, in response to receiving a signal from the transceiver 18, the identification device 12 responds by sending the information stored on the memory chip 14 to the transceiver 18 via the transmitter 16. Thus, in this embodiment, the reader 20 is able to identify the device of interest 10 and store identification and/or location data in its memory 22 associated with the device of interest 10.

In one implementation, the reader 20 is a battery operated wireless device configured to detect and receive communication from an identification device 12. In such an implementation, the reader 20 is battery operated so that it can be carried with an employee out in the field. For example, the field employee may carry the reader 20 in a bag, or in a pocket. Alternatively, the reader 20 may be configured to fit in a clip which attaches to a belt or the reader may be configured to hang around a field employee's neck, similar to identification badges. As the field employee visits facilities having devices of interest, such as the device of interest 10, the reader 20 detects and records the identification and/or location information stored on the memory chips 14 of respective devices of interest 10 which come within range of the reader 20. Subsequently, the identification data stored on the reader 20 may be accessed and stored in a database for tracking of the installed base of equipment.

Figure 2:
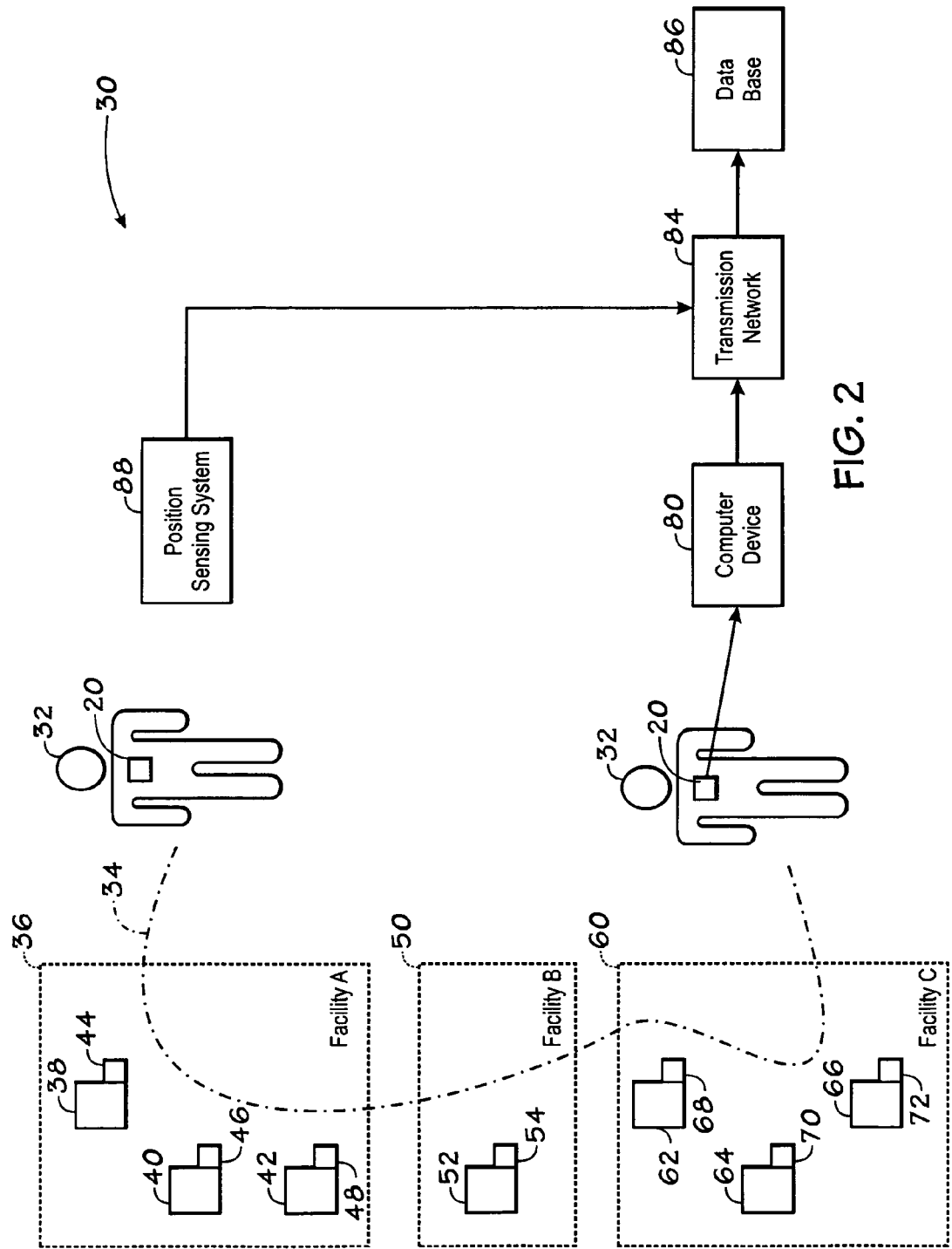
FIG. 2 illustrates an equipment tracking system in accordance with an exemplary embodiment of the present invention.

Turning to FIG. 2, an equipment tracking system is illustrated in accordance with embodiments of the present invention and is generally designated by the reference numeral 30. In the depicted embodiment, a field employee 32 carries a reader device 20 during a work day as the field employee 32 performs normal work duties. The field employee may be an installer, an engineer, a service technician, or any other employee who frequently visits installed systems as a routine part of their job.

The field employee 32 may visit multiple facilities in a given day, and as such, may encounter multiple devices included in the installed system database. For example, during a work day or over the course of several days, an employee 32 may travel a path 34 when servicing equipment. The exemplary travel path 34 of FIG. 2 depicts the employee 32 visiting multiple facilities, initially passing through a first facility 36. First facility 36 houses multiple devices which are being tracked in the installed system database. Specifically, the first facility 36 houses devices 38, 40, and 42, each with an accompanying identification device 44, 46, and 48, respectively. As the employee 32 passes the devices 38, 40, and 42, the reader 20 records the presence of the devices by receiving a transmission from the identification devices 44, 46, and 48 attached to the devices 38, 40, and 42. The reader may, in some embodiments, be configured to associate the received data with the time and date the identification data was received.

As discussed above, various types of identification devices may be implemented including passive, semi-passive, and active. Depending on the type of device implemented, the reader 20 may need to pass within a few millimeters of the identification devices 44, 46, and 48, or only come with tens of meters in order to receive the identification data transmitted. It is not necessary, however, that each device 38, 40, and 42 be detected in every visit to the first facility 36. For example, it is possible that upon visiting the first facility 36, the field employee 32 only comes into proximity with the device 38 and only reads and records identification data from identification device 44. The reader, therefore, does not detect the other devices, and the installed data base is updated only with regards to the device 36.

It is expected that every device continuing in use and, therefore, still a part of the installed base will eventually be detected though the normal course of business. Specifically, without any special effort on the part of the field employee 32, the reader 20 will eventually be exposed to all the devices currently in use. For example, on subsequent visits to the first facility 36, the field employee 32 may encounter one or both devices 38 and 40 and detect their identification devices 46 and 48, respectively. In this manner, the field employee's 32 normal routine provides verification of the presence of devices 38, 40, and 42 at the first facility 36 even though the presence of each device might not be noted each visit.

After passing through and detecting the devices housed in the first facility 36, the employee 32 may pass through a second facility 50 and detect device 52 via the identification device 54 attached to device 52. Eventually, the employee 32 may also pass through a third facility 60 and detect devices 62, 64, and 66, via their identification devices 68, 70, and 72, respectively. In the event that device 66 had originally been housed in the first facility 36 and subsequently moved to the third facility 60, the system would still be able to accurately reflect installed base because the path 34 of field employee 32 (or the aggregated paths of some or all of the field employees 32) spans both facilities. Furthermore, as will be discussed below, the tracking system may be configured to indicate the location of the devices.

In one embodiment, the data saved on the reader device 20 is periodically downloaded to a computing device 80. The computing device 80 may be a mobile device, such as a laptop, a PDA, or similar device, or maybe a desktop computing device such as a personal computer. The data may be transferred via USB, firewire, or similar transfer technology. Alternatively, the information may be saved to a memory module or similar device to be transferred to the computing device 80. In one embodiment, the computing device 80 transfers the data via a transmission network 84, such as the Internet, to a database 86. In this embodiment, once the data arrives at the database 86, software receives the data, associates and organizes the data, and stores the data, such that it is reflective of the installed base.

The tracking system may also be configured to associate location information along with the identification information. To do so, a position sensing system 88 may accompany an employee 32 as the employee 32 visits facilities. The position sensing system 88 may be a GPS system, for example, that is placed in a vehicle used by the employee 32 when visiting facilities. The location of the vehicle may be continuously reported to the database 86 via the network 84. The location of the vehicle can be associated with a date and time and once the identification data from the devices arrive at the database the location can be associated with the identification data according to the date and time it was recorded.

Alternatively, the position sensing system 88 may be provided on the device of interest 10. In one alternate embodiment, position sensing system 88 is coupled to identification device 12 and is configured to sense the location of the device 10. The location data is communicated by the identification device 12 to reader 20. Because the position sensing system 88 is on the device 10, the location of the device 10 can be very accurate. While this alternative embodiment may be more costly, the cost may be negligible when compared to the cost of the device of interest 10.

Depending on the resolution desired or required by a user of the installed system database, in an alternative embodiment, a GPS system may be carried by the employee 32 as the employee visits the various facilities. This embodiment may allow the GPS system 30 to determine the location of a device within a matter of feet, rather than simply the location of the facility where the device is housed. In yet another alternative embodiment, the time and date of detection may be associated to the field employee's appointments as recorded in dispatching systems. Thus, additional information about the approximate location of the device of interest can be roughly determined. As such, the spatial resolution of the system 30 may be configured to the specific needs of the entity collecting the data of the installed base.

In an alternative embodiment, the system 30 can be implemented as an alert system to find missing devices. For example, if a device is reported as missing, or stolen, or is important for some other reason and needs to be located, a reader 20 can be configured to indicate when the device is nearby. Specifically, an alert can be issued through either a visible or audible alarm or via a vibration, or in any other detectable manner to indicate that the particular device is nearby.

Knowing simply that an instrument still exists, because it has been encountered and that encounter has been recorded, can have significant value to a company for many reasons. For example, the company may be making end-of-life decisions for a product line. Knowing that there have been no encounters of that instrument type for three years may simplify the decision.

The system and methods disclosed assume that over time the field employees 32 will be exposed to all, or nearly all instruments of interest. It is not necessary, therefore, that every instrument be encountered in every visit. Employees may follow their normal course of business without making any intentional effort to be exposed to all instruments in the installed base. At the end of regular periods, such as the end of a day or a week, the employee can attach the wireless reader to the computing device 80 and transmit the recorded data to the database 86 where the data is received, stored, and associated.

The tracking system 30 is scalable in cost and capability. For example, for cost savings, only passive identification devices may be implemented. Additionally, the reader devices may have fewer features and smaller memories. Alternatively, the system 30 may be configured to utilize GPS technology. Additionally, in order to increase or extend the reach of the system 30, the only expense would be additional identification devices and readers.

Figure 3:
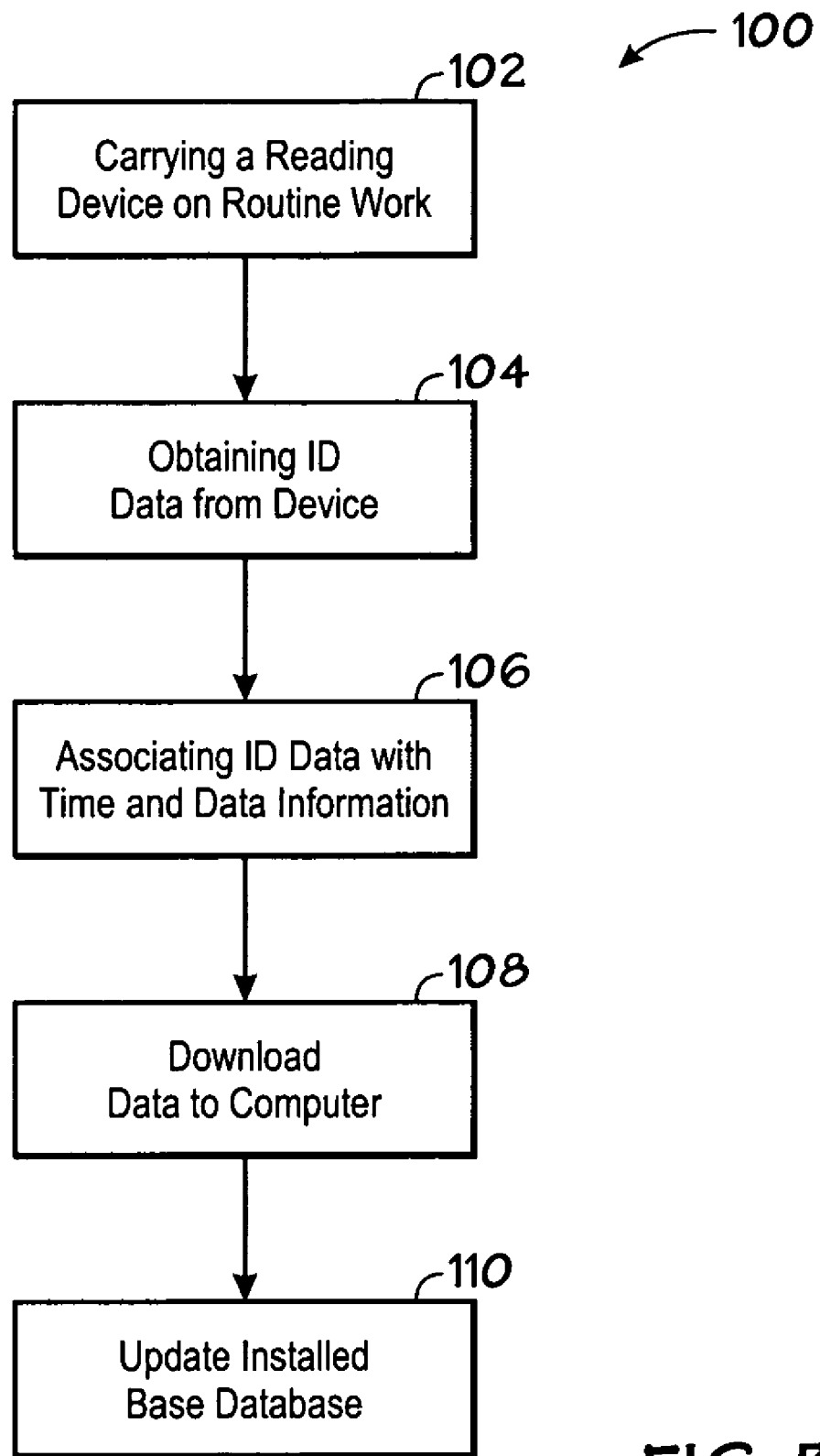
FIG. 3 is a flow chart illustrating a method for tracking equipment in accordance with an exemplary embodiment of the present invention.

FIG. 3 illustrates a flow chart showing the technique of maintaining an installed base database in accordance with embodiments of the present invention and is generally designated by the reference numeral 100. The technique 100 is carried out by carrying a reader device 20 on routine work appointments, as indicated by block 102. The reader device 20 may be configured to transmit and receive information from identification devices 12, or tags, attached to devices of interest 10. The reading device 20 obtains identification data from devices, as indicated by block 104 and associates the identification data with time and date information as indicated by block 106. The association of the identification data with the time and date information allows the database to reflect how recently a particular device has been seen and may reflect whether or not the device is still in use. Additionally, the time and date information may be used for location determination, as discussed earlier. The identification data and time and date information are downloaded to a computer, as indicated by block 108. The data is then provided to a database to update and install the base database, as indicated at block 110.

Implementing the technique 100 has several advantages over existing techniques of maintaining an installed base database. Namely, the technique 100 does not require an extensive installed infrastructure, as readers 20 are carried by employees 32 to the various devices of interest. Additionally, the system can be scaled in cost and capability, adding additional precision and location by adding GPS or other technologies where needed, but omitting such capabilities and reducing costs, when precision is not needed. There is no cost necessary beyond the tags and readers to extend the reach of the infrastructure, as the employees move, so does the infrastructure. Another advantage is that the system may be independent of both customer, manufacturer, and/or service provider. Specifically, if a customer severs a relationship with a company maintaining the installed base database, there is no infrastructure to remove. Similarly, if a service provider takes on responsibility for instruments or equipment it does not manufacture or did not previously maintain, a simple application of an identification device 12 to the new devices 10 to be tracked may be sufficient to include those devices in the tracking system.

The system and methods disclosed provide data for business decisions as well as data for regulatory decisions, such as how many systems need to be recalled and/or where they are located. The information used gives a sufficiently accurate indication of the installed base and provides the various advantages described above.

Alternative embodiments of the present technique allow for the tracking of other assets or items of interest, such as animals and trailers. In such alternative embodiments, the reader 20 may be carried by an employee or transported by other moveable objects or means, such as a truck cab or farm vehicles. As with previously described embodiments, the collection of data occurs as the employee and/or vehicle carries out normal activities. No directed effort is required to collect the data.

For Example, the tracking of animals, the identification device 12 may be installed subcutaneously. The reader device 20 may be carried on vehicles or workers that commonly come into close proximity with the animals. As the vehicle or worker approaches the animal, or the animal approaches the vehicle, the reader device 20 automatically obtains the identification data of the animal. As with the previously described embodiments, positional information can be determined through a variety of means. The system, with or without the ability to determine position, allows for tracking the location of the farm animals, livestock, or other valuable goods which are mobile or movable.

Similarly, a truck trailer or other transport container can be tagged with an identification device 12 and a truck cab or other vehicle likely to come in contact with a transport container can be equipped with a reader device 20 coupled to a global position system. As the reader device 20 obtains identification data from a truck trailer or container, positional information is recorded and associated with the identification data obtained from the identification device 12 on the truck trailer or container.

While only certain features of the invention have been illustrated and described herein, many modifications and changes will occur to those skilled in the art. It is, therefore, to be understood that the appended claims are intended to cover all such modifications and changes as fall within the scope and spirit of the invention.

The invention claimed is:

1. A method for tracking devices comprising:
assigning a reading device to each of a plurality of field workers, the reading device configured to passively receive identification data from a transmitter in the course of the field worker's normal duties without action on the part of the field worker;
providing the identification data to a database; and
associating general location information with the identification data based upon the field worker's planned itinerary.

2. The method of claim 1 comprising associating the identification data with time and date information.

3. The method of claim 1 comprising installing a transponder on a device to be tracked.

4. The method of claim 1 comprising collecting specific location information associated with the identification data.

5. The method of claim 1 wherein providing the identification data to a database comprises:
downloading identification data to a computing device; and
transferring the identification data to the database via network connection.

6. The method of claim 1 wherein the database reflects an installed base.

7. A method of tracking installed systems comprising:
carrying a wireless reader to multiple geographic locations where devices of interest are installed;
collecting identification data for the devices of interest using the wireless reader without action on the part of the person carrying the reader; and
collecting location information associated with the devices of interest;
providing the identification data and the location information to a database by using separate respective devices to transmit the identification data and the location information to the database in separate respective data packets.

8. The method of claim 7 wherein collecting location information comprises providing a global positioning system device in a vehicle.

9. The method of claim 7 wherein collecting location information comprises carrying a separate global positioning system device with the wireless reader.

10. The method of claim 7 comprising associating an appointment log with the identification data.

11. The method of claim 7 comprising associating identification data with time and date of collection.

12. A system for tracking installed equipment comprising:
an information device associated with a piece of equipment configured to transmit identification data corresponding to the equipment, wherein the equipment is installed at one of a plurality of geographically distinct service locations;

a wireless receiver configured to receive the identification data when transmitted without user action, wherein the wireless receiver is carried by one of a plurality of service workers tasked with traveling to the geographically distinct service locations;

a computing system comprising a database, wherein the database is configured to receive the identification data and location information corresponding to the equipment, wherein the location information is determined based upon the service worker's planned itinerary and wherein the computing system is configured to associate the identification data with the location information.

13. The system of claim 12 comprising a global positioning system configured to provide the location information to the database.

14. The system of claim 12 wherein the wireless receiver comprises an alarm, wherein the alarm indicates proximity of the wireless receiver to the equipment.

15. The system of claim 12 wherein the wireless receiver is a handheld wireless receiver.

16. A method for maintaining a database of devices of interest, comprising:
    tagging each device of interest with a wireless identification device, each wireless identification device containing identification information for the device of interest to which it is tagged;
providing a reading device to each of a plurality of field workers, wherein when the reading device is transported within communication range of at least one of the devices of interest, the reading device receives the identification information for the device of interest and stores the date and time that the device of interest was encountered;
    updating a database of the devices of interest using the identification information received by the reading device; and
    associating general location information with the identification data based upon the field worker's planned itinerary at the time and date that the device of interest was encountered.

17. A method for maintaining an installation database of devices of interest, comprising:
    tagging each device of interest with a wireless identification device, each wireless identification device containing identification information for the device of interest to which it is tagged;
    providing a reading device to each of a plurality of field workers who travel to multiple geographically distinct locations where the devices of interest are installed, wherein each reading device is configured to receive the identification information for the devices of interest when the field worker travels within communication range of the wireless identification devices; and
determining location information corresponding to one of the devices of interest having a wireless identification device of which the field worker travels within communication range;
    transmitting the identification information acquired using the reading device to the installation database as a first data packet;
    transmitting the location information to the installation database as a second data packet using another device separate from the reading device; and
    associating the identification information with the location information after the first and second data packets are received by the installation database;
    updating an installation database of the devices of interest using the identification information received by the reading devices, wherein updating an installation database of the devices of interest using the identification information received by the reading devices comprises:
    determining location information corresponding to one of the devices of interest having a wireless identification device of which the field worker travels within communication range;
    transmitting the identification information acquired using the reading device to the installation database as a first data packet;
    transmitting the location information to the installation database as a second data packet using another device separate from the reading device; and
    associating the identification information with the location information after the first and second data packets are received by the installation database.

18. The method of claim 17, wherein the devices of interest include healthcare equipment, and the field workers provide service for the healthcare equipment.

19. The method of claim 18, wherein the locations where the field workers travel include a plurality of healthcare facilities which use different asset tracking systems.

20. The method of claim 17, further comprising sensing the location of each device of interest when the reading device receives the identification information for that device of interest, wherein updating the installation database includes updating the location at which that device of interest is installed.

21. The method of claim 20, wherein the devices of interest include healthcare equipment, and the installation database tracks the installed locations of that equipment.

22. The method of claim 1, wherein the reading device comprises an alarm, and wherein the alarm is configured to indicate the proximity of the transmitter to the reading device.

23. The method of claim 4, wherein the identification data and the specific location information are transmitted to the database as separate respective data packets from separate devices, and wherein the specific location information and the identification data are associated after their respective data packets are received by the database.

24. The system of claim 12, wherein the identification data and the location information are transmitted to the database as separate respective data packets from separate devices, and wherein the general location information and the identification data are associated with one another after their respective data packets are received by the database.

25. The method of claim 17, wherein the reading device comprises an alarm, and wherein the alarm is configured to indicate the proximity of the devices of interest to the reading device.

26. The method of claim 17, comprising associating general location information with the identification information based upon the field worker's planned itinerary.

* * * * *